US008774168B2

(12) United States Patent
Petrack (10) Patent No.: US 8,774,168 B2
(45) Date of Patent: Jul. 8, 2014

(54) COMMUNICATION SYSTEM AND METHOD (75) Inventor: Scott Petrack, Palo Alto, CA (US)

(73) Assignee: Skype, Dublin 2 (IE)

( * ) Notice: Subject to any disclaimer, the term of this patent is extended or adjusted under 35 U.S.C. 154(b) by 75 days.

(21) Appl. No.: 13/086,821

(22) Filed: Apr. 14, 2011

(65) Prior Publication Data

US 2012/0263168 A1 Oct. 18, 2012

(51) Int. Cl.
H04L 12/66 (2006.01)

(52) U.S. Cl.
USPC .......................................... 370/352

(58) Field of Classification Search
USPC ......... 726/7, 27; 709/204, 205, 233; 235/382; 379/202.01, 114.21; 348/14.09; 370/261; 375/240.16
See application file for complete search history.

(56) References Cited

U.S. PATENT DOCUMENTS

| 6,374,102 | B1 * | 4/2002 | Brachman et al. ......... 455/422.1 |
| 6,961,416 | B1 | 11/2005 | Summers et al. |
| 7,761,591 | B2 * | 7/2010 | Graham ........................ 709/233 |
| 7,881,446 | B1 * | 2/2011 | Apple et al. ............. 379/114.21 |
| 8,144,632 | B1 * | 3/2012 | Chapweske et al. .......... 370/261 |
| 2001/0016007 | A1 * | 8/2001 | Wu et al. .................. 375/240.16 |
| 2004/0199580 | A1 * | 10/2004 | Zhakov et al. ................ 709/204 |
| 2006/0092863 | A1 * | 5/2006 | Schmidt et al. ............... 370/260 |
| 2007/0123239 | A1 | 5/2007 | Leigh et al. |
| 2008/0043091 | A1 * | 2/2008 | Lia et al. .................... 348/14.09 |
| 2008/0191009 | A1 * | 8/2008 | Gressel et al. ................ 235/382 |
| 2008/0320081 | A1 * | 12/2008 | Shriver-Blake et al. ...... 709/205 |
| 2009/0282103 | A1 * | 11/2009 | Thakkar et al. ............... 709/204 |
| 2011/0135079 | A1 * | 6/2011 | Shah et al. ............... 379/202.01 |
| 2011/0271332 | A1 * | 11/2011 | Jones et al. ...................... 726/7 |
| 2011/0314554 | A1 * | 12/2011 | Woods ............................ 726/27 |

FOREIGN PATENT DOCUMENTS

EP 1608190 12/2005
JP 2010026697 A * 2/2010 .............. G06F 21/22

OTHER PUBLICATIONS

"International Search Report and Written Opinion", Application No. PCT/EP2012/056718, (Jul. 10, 2012), 11 pages.

* cited by examiner

Primary Examiner — Asad Nawaz
Assistant Examiner — Parth Patel
(74) Attorney, Agent, or Firm — Sonia Cooper; Jim Ross; Micky Minhas (57) ABSTRACT A system comprising: one or more first user terminals each for a respective user, each of the first user terminals comprising a first interface to a service run over a communication network; an authorization mechanism arranged to conditionally verify the users of the first user terminals as being licensed to use the communication service based on a first indication received via the first interface; and one or more second user terminals each for a respective user, each of the second user terminals comprising a second, alternative interface to the communication service; wherein the second interface is not operable to provide the first indication to the authorization mechanism; and wherein the authorization mechanism is configured to conditionally verify the users of the second user terminals as being licensed to use the communication service based on a second indication received via the second interface.

19 Claims, 3 Drawing Sheets

COMMUNICATION SYSTEM AND METHOD

FIELD OF THE INVENTION

The present invention relates to a mechanism for authorising a user to participate in a communication session such as a voice or video conference conducted over a communication network.

BACKGROUND

It is known to provide a system for conducting a telephone conference over a circuit-switched telephone network, e.g. a fixed-line network such as a PSTN (public switched telephone network) or POTS ("Plain Old Telephone Service"). "Conference" in this context means a call which can in principle be accessed by three or more participants (users) simultaneously, each accessing the call from a different respective end-point terminal (there are in fact a percentage of conference calls where only two parties dial into a bridge—they're conference calls because they use a conference bridge, even if the access code was given only to two parties, and even if the organizer reserved only two ports on the bridge). To access the conference call, users typically dial in to an audio conference bridge and enter an access code which demonstrates that they are authorised to access the conference, e.g. having been invited by the organiser. Other forms of access control also found, both in addition to and as a substitute for the access code.

It is also known to enable voice or video conference calls over a packet-based communication system such as a VoIP system ("voice over internet protocol") implemented over an internetwork such as the Internet. Again "conference" means that three or more users at respective end-points can in principle participate simultaneously in the same call. To enable VoIP calls, a communication client application is installed on a terminal (e.g. on a smart phone, tablet, laptop or desktop computer, or even a household media appliance such as a television set or set-top box). (Note: if the terminal is a hardware PBX (VoIP) phone, or a sip-phone, the user installs no software—a hardware VoIP handset typically ships with whatever software it needs so the user installs nothing.) When executed on the terminal, the VoIP client may first enable the user to register a username with a database which maps usernames to IP addresses (either a distributed peer-to-peer database stored amongst multiple end-user terminals and/or a database stored at a server of the VoIP provider). An executed VoIP client may then access this database in order to set-up a call by looking up the IP address for the callee. Each user also might use their client to maintain a respective contact list at a server of the VoIP provider, which lists other users with whom that user has mutually agreed to become contacts such that the user and the contacts are mutually authorised to call one another. The user can select contacts from the contact list to invite into a conference call. Since participation in the conference call is administered by means of the usernames and contact lists, VoIP systems do not conventionally involve the need to dial in an access code.

It is also possible to conduct a call between a VoIP client and a conventional telephone of a circuit-switched network. This is conventionally achieved via a gateway between the circuit-switched network and the packet-switched network. In this case the VoIP user may supply a telephone number from his or her client application to the gateway over the packet-switched network, and the gateway then dials out to the relevant end-point of the circuit-switched network; or the user of the telephone in the circuit-switched network dials a telephone number which switches to the gateway, and the gateway then maps the telephone number to a user of the VoIP system and routes the call to the relevant IP address. If the VoIP user then adds other participants, the call can become a conference call involving both VoIP users and a circuit-switched telephone user.

SUMMARY

However, none of the above models anticipates a situation where specific automated phone authorisation is required for that special group of users (often called "organizers") of the conferencing system who are authorized to create, manage and/or maintain the data resources associated with individual conferences. Typically, this is because users perform these activities via a web browser, the requests being authorized via a userID/password pair. A conference access code, which is the typical access token for a user whose terminal is a phone accessing the conference via a conventional PSTN bridge (in contrast to the ID/password pair that a browser user can enter), is a poor choice for the token to obtain authorization for the data resource management tasks. A conference access token is typically generated or obtained by the organizer and then emailed or sent via text message to the entire participant list. By its very nature it is conference-specific, and shared with everyone who is expected to participate—often including non-employees of the company that bought the license to the conference service. By contrast, the access codes required to enable an "organizer" to manage his conference service need to be the exact opposite: they must not be shared with anyone, and they function outside of any particular conference. (For example, in the case of a conference calling service, this is how a user authorizes his request to obtain a new conference access code). In addition to these very traditional uses of an authorization token within a phone call to a server, there is a new reason emerging for the requirement that authorized users of the service be capable of proving their authorization over the phone (traditional or VoIP). In some emerging business models, the owners of the communications service consider it to be like any other software—and want business users to have the proper software licence during the communication service call itself. In the case of conferencing service, they do not require that every participant in the audio have a separate license for the service, but (taking their analogy of software licensing seriously), they want to ensure that at least one bon fide licenced authorized user is present in every call which is serviced by the Conference calling service. It is an aim of the present invention to provide for such authorisation-by-phone to use a VoIP conferencing service, or other packet-based conferencing system, or indeed any communication-service, where the service is fundamentally based on software and licensed to end-users via a server software licence.

Modern technology has transformed many communications network services so as to be implemented in the form of software running on off-the-shelf platforms, and so it is natural that some of these new services will be governed by various technologies for software licensing (many of which are now commonplace). However, a problem is that even though these items of software are implemented in computer code running on standard servers for example, some users who buy or lease the licences may not have access to a suitable computer interface that would otherwise manage the activation of the license. Such users may only have access to a network interface that is inherent to a particular alternative form of communications. For example, a user of a telephone audio-conference service might only have access to the service via the telephone of a circuit-switched network such as a PSTN or cellular module network. I.e. so even though the entire back-end of the communications services might be implemented in software with "regular" software licenses, the front-end for some users might not change at all. Therefore it would be desirable to provide a way to access and manage the software license using alternative forms of communications technology, e.g. to let those users with a more traditional communications front-end to activate (and optionally manage) the necessary software licences.

According to one aspect of the present invention, there is provided a system comprising: one or more first user terminals each for a respective user, each of the first user terminals comprising a first interface to a communication service run over a communication network; an authorisation mechanism arranged to conditionally verify the users of the first user terminals as being licensed to use the communication service based on a first indication received via the first interface; and one or more second user terminals each for a respective user, each of the second user terminals comprising a second, alternative interface to the communication service; wherein the second interface is not operable to provide the first indication to the authorisation mechanism; and wherein the authorisation mechanism is configured to conditionally verify the users of the second user terminals as being licensed to use the communication service based on a second indication received via the second interface.

In embodiments, the second indicator may comprise an identifier of the second user.

The system may comprise a database storing a first user identifier for each of the users of the first and second terminals, and the second indicator may comprise a second user identifier other than the first user identifiers.

The first identifier may comprise a username identifying the respective user within the communication service, and second identifier may comprise a PIN number.

The authorisation mechanism may be configured to map each of the second user identifiers to the respective first user identifiers of at least the users of the second terminals, and the authorisation mechanism may be configured to perform an additional check of the one or more users of the second terminals based on the first user identifier.

The system may comprise a database storing a first user identifier for each of the users of the first terminals, wherein the first indication may comprise the first user identifier, and the authorisation mechanism may be configured such that said verification of each of the one or more users of the first user terminals comprises verifying that the first user identifier is associated with a valid license.

Said communication service may comprise a voice or video conferencing service.

Said communication network may comprise a packet-switched network, said system may further comprise a gateway connected between the packet-switched and a circuit-switched network, said first interface may be an interface to the packet-switched network and said second interface may be an interface to the circuit-switched network.

The second terminal may not be equipped with an interface to a packet-switched network other than via said gateway.

Said circuit-switched network may be a fixed-line network and said second terminal may be a telephone.

Said circuit-switched network may be a mobile cellular network and said second terminal may be a mobile phone.

The first interface may comprise a communication client application having an associated license integrated into at least one of the client and authentication mechanism, and the second interface may comprise a legacy client without an associated license integrated into the communication service.

The first interface may comprise a communication client application having an associated license integrated into the at least one of the client and authentication mechanism, and the first indication may comprise an indication of the associated license.

The system may comprise a server of the communication service, wherein the server of the communication service may comprise said database.

The system may comprise a partner server, wherein the partner server may comprise at least a portion of said authorisation mechanism which verifies the users of the second user terminals based on the second indication.

The server of the communication service may be arranged to provide the first user identifiers to the partner server for use in said verification.

The server of the communication service may provide the first user identifiers to the partner server in encrypted form.

Said additional check may comprise: checking that the same user is not involved in two or more different conferences at once, and/or that the two or more different users are not using the same second identifier.

According to another aspect of the present invention, there is provided a method of authorising user to use a communication service run over a communication network, the method comprising: from each of one or more first user terminals of a respective one or more users, receiving a respective first indication over a communication network via a first interface between the first user terminal and the communication service; conditionally verifying the users of the first user terminals as being licensed to use the communication service based on the first indication received via the first interface; from one or more second user terminals of a respective one or more users, receiving a respective second indication via a second, alternative interface between the second user terminal and the communication service; wherein the second interface is not operable to provide the first indication; and conditionally verifying the users of the second user terminals as being licensed to use the communication service based on a second indication received via the second interface.

In embodiments the method may further comprise any combination of the operations as performed by any of the above system elements.

According to another aspect of the present invention, there is provided a computer program product embodied on a non-transient, computer-readable medium and comprising code configured so as when executed one or more processors of one or more network elements to perform the operations in accordance with any combination of any of the above system of method features.

BRIEF DESCRIPTION OF THE DRAWINGS

For a better understanding of the present invention and to show how it may be put into effect, reference is made by way of example to the accompanying drawings in which.

DETAILED DESCRIPTION OF PREFERRED EMBODIMENTS

When users dial in to a conventional audio conference bridge, they typically enter an access code which doesn't identify them personally. This is true even if the particular conference admits separate "leader access codes" and "participant access codes". In many cases the organizer of the conference gives out the same participant code or even his leader access code to many people. However, this would create a problem if a licensing model for the audio conference service requires that a software license holder be present in every active conference. This should be easy to verify if the members of the audio conference are also participating in some online session associated with the audio conference. However, if users are only dialled in via a PSTN (at least, when all users who actually hold software licenses are only dialled-in by PSTN), there needs to be some way to verify that at least one license holder is in the call. The following describes a method for achieving this, even when all participants have nothing but standard dial-in access.

In embodiments of the present invention, every subscriber to the VoIP audio conferencing service and/or screen sharing service will be provisioned or provision him/her-self with a PIN (personal Identification number). This can be done via a variety of means (PSTN, WEB, other IP data, etc.). Preferably this PIN is a string of digits which is unique to each subscriber; or at least highly likely to be unique. It is quite possible to allow the users to choose their own PINs, as long as each one is checked to ensure its uniqueness in the universe of all the PINs associated with the conference system in question.

When a user dials in to the conference bridge, a voice prompt instructs the user to enter the conference access code. Once that code has been entered, verified, and accepted, there is a second prompt which instructs the user to enter his or her PIN if he or she has one. The conference will not be activated (i.e. the multiple participants will not be able to hear one another) until at least one user enters his or her PIN. In this manner, the system can receive some level of assurance that a license holder is indeed in the conference.

Via a set of heuristic rules, the system can both incentivize users to enter their PINs when they dial in (in the case that they have one), and disincentivize users from entering someone else's PIN (in the case that they haven't got one). For example, the PIN information can be used to enable the system to properly "light up" the name of the speaker in some GUI (graphical user interface) associated with the conference; then if a second user enters PIN information which has been already entered in any audio conference which is active on the system, both users with the PIN in question can be removed from their conference, and asked to re-enter their PIN information. The PIN information can also be used as a key to activate special services, such as spoken name announcements, etc.

The PIN isn't restricted to being a string of digits in any particular format. For example, it would be very reasonable to allow users to use their online number as the PIN (when they have subscribed to an online number). This would certainly guarantee the uniqueness of PINs. The online number is a PSTN phone number which is owned by the VoIP provider, such that when a PSTN phone caller calls that number, the incoming phone call is delivered from the PSTN network 109 to the gateway 106 and the gateway can then turn the call into a VoIP call to user of a VoIP client 222, or turn it into a SIP call to some SIP server ("SIP", Session Initiation Protocol, is a non proprietary internet standard protocol for VoIP calls). In embodiments of the present invention, it may be arranged that the conference call numbers—the phone numbers that people dial—are all online numbers. So users dial into a conference call, and it is actually a VoIP server 104 that answers the phone call. The VoIP server 104 then routes the call via SIP over to a partner server 105, and it's the partner server 105 server that greets the user with a welcome message (e.g. "Welcome to the VoIP conference. Please enter the conference access code . . . . Thank you, now if you have a PIN on the system, please enter that now."). Since the server that answers the online number is a VoIP server 104, then the VoIP provider can log the caller ID of the caller, as well as whatever access code and/or PIN number the user enters. Since the actual conference server is a partner server 105, the partner can also log the same information. This way, at the end of the month, the VoIP provider and partner can compare accounts and reconcile the bill.

An example implementation of the invention is now described with reference to FIGS. 1 to 4.

Figure 1:
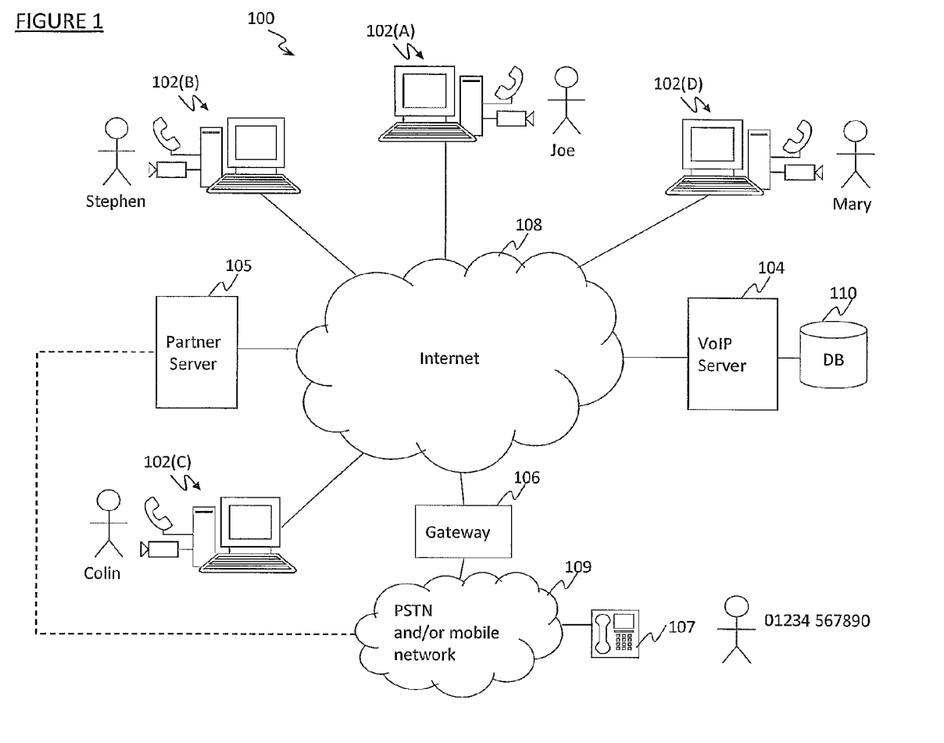
FIG. 1 is a schematic representation of a communication system.

FIG. 1 is a schematic illustration of an arrangement 100 comprising a packet-based network such as the Internet 108. The arrangement comprises a plurality of user terminals 102 such as desktop or laptop computers or internet-enabled mobile phones, each comprising a network interface 202 such as a wired or wireless modem for connecting to other devices or terminals 102, 104, 105, and/or 106 over the Internet 108. Some details of an example user terminal 102 are illustrated schematically in FIG. 2. The system may also comprise one or more hardware "dumb IP phones" as well (not shown), connected to the Internet 108

The arrangement 100 also comprises a server 104 of a VoIP provider, and a further server 105 of a partner of the VoIP provider. Each server 104, 105 is also connected to the Internet 108. In the following the term "server" will be used in the singular, but it will be appreciated that this is not intended to exclude the possibility of multiple server units which may be located at one or more sites.

Furthermore, the arrangement comprises a circuit-switched telephone network 109 such as a fixed-line (landline) network or mobile telephone network, and a gateway 106 connecting between the circuit-switched telephone network 109 and the Internet 108. A telephone 107 is connected to the circuit-switched network 108 by means of a wired or wireless connection. The gateway 106 could comprise one or more gateway units located at one or more sites. The gateway function itself could be distributed over a very large number of Internet hosts.

In operation, each user of the VoIP communication system is allowed access to the contact information of a subset of the user base maintained by the VoIP server 104, this subset being referred to as a contact list or contact group. Typically the contact list is defined by users who have mutually agreed to become one another's contacts. When a user logs on to his or her VoIP client application 222 it retrieves the contact list from the VoIP server 104, and may subsequently poll the VoIP server 104 for updates to the contact information of the contacts on the contact list. Contact information may comprise for example a username, a profile picture to represent the contact, and/or a "mood message" giving a brief statement about the contact.

When a user (the caller) wants to establish a one-to-one (non-conference) voice or video call with a contact (the callee), the caller's client 222 submits a request comprising the username of that contact to an address look-up table which maps usernames to IP addresses. In the case of a peer-to-peer (P2P) system, the look-up table may be implemented in the form of a distributed database distributed amongst other users' terminals 102 of the VoIP system. In other systems the look-up table may be implemented on one or more centralised server units 104. Either way, in response to the request, the look-up table returns the corresponding IP address of the contact's user terminal 102(B) to the caller's user terminal 102(A). The client 222 running on the caller's terminal 102 (A) can then use the IP address to set up a communication channel with the client running on the contact's user terminal 102(B) and use this communication channel to conduct a voice or video call.

The client application 222 also allows calls to be made to a traditional circuit-switched network 109 such as a fixed-line network or mobile cellular network. These calls are made by establishing a communication channel with the gateway 106 coupled between the Internet 108 and circuit-switched network 109, and supplying a suitable telephone number from the client 222 to the gateway 106.

Figure 2:
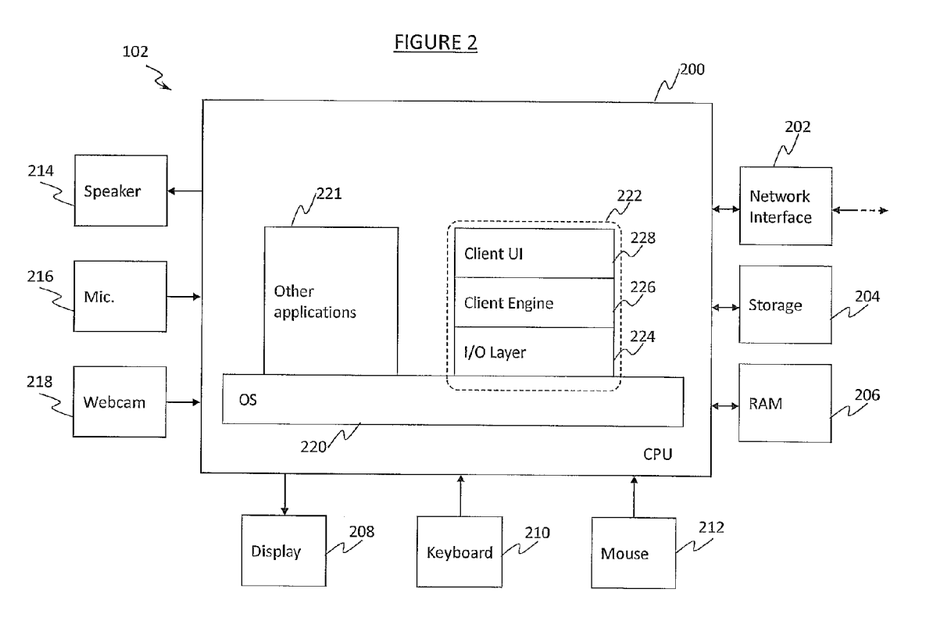
FIG. 2 is a schematic block diagram of a user terminal.

An example user terminal 102 is shown schematically in FIG. 2. The user terminal 102 comprises a CPU 200 executing a client application 222 and potentially other applications 221 under control of an operating system 220. The CPU 200 is coupled to: a network interface 202 for connecting to the Internet 108, a storage device 204 such as a hard drive or flash memory storing the client application 222, a RAM 206, one or more user input devices such as a keyboard 210 and mouse 212, a display screen 208 for displaying video and the user interface of the client 222 and web-browser 221, a speaker for outputting audio such as the decoded speech signal of a call, a microphone 216 for receiving input speech signals, and a webcam 218 for receiving video signals.

The client application 222 comprises a protocol stack having an input-output (I/O) layer 224, a client engine 226, and a UI layer 228. The I/O layer 224 comprises an audio and/or video codec responsible for encoding speech and video signals from the microphone 216 and/or webcam 218 for transmission via the network interface 202 over the Internet 108, and for decoding encoded speech and video signals received from other such user terminals 102 via the Internet 108 and network interface 202 for output to the speaker 214 and display 208 respectively. The I/O layer 224 may also comprise an application programming interface (API) for communicating with the partner server 105.

The client engine 228 is then responsible for higher-level functions such as retrieving the contact list, uploading the user's own contact information, call set-up, connection management, and other functions such as exchanging presence information with contacts. The UI layer 228 generates outputs the user interface of the client 222 to the display 208, including on-screen controls for controlling the overall operation of the client 222 in response to user inputs from the user input devices 210 and/or 212.

Figure 3:
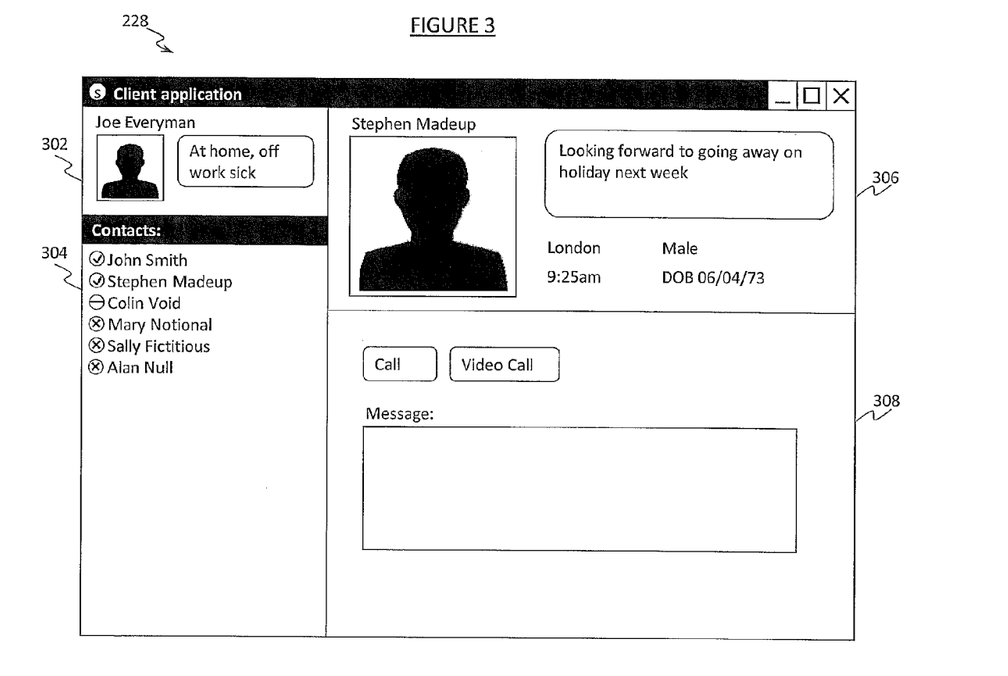
FIG. 3 is a schematic representation of a user interface.

An example user interface of a client application 222 is shown in FIG. 3. This may comprise a panel showing the user's own profile 302, a contact list panel 304, a panel showing the profile of a selected one of the contacts 306, and a control panel 308 comprising on-screen controls for establishing communications such as voice or video calls or IM chat messages with one or more selected contacts.

The contact list panel 304 displays contact information for each of the contacts in the user's contact list, such as the contact's names. The contact list panel 304 may also display other information associated with the contacts such as their presence. The presence information indicates the availability of the contact for communication and preferably is at least partially defined by the contact themselves. E.g. the presence information could comprise an indication that the contact is offline (x), online but has selected to be unavailable (—), or online and has selected to be available (√). Some other information such as a contact's profile picture or mood message may also be displayed in the profile panel 306. Further, note that some of the contact information such as a contact's username need not necessarily be displayed explicitly on the screen.

The above has explained how a user of a VoIP client 222 can establish a one-to-one call (i.e. a non-conference call) with one other VoIP user or with a telephone 107. However, to establish a conference call may require additional functionality. Particularly, a conference will require routing of an instance of the voice stream (and potentially also an instance of a video stream) to each of multiple recipients. Further, if multiple parties are speaking at once, and/or the conference is a video conference in which all parties see each other at once, then the conference will require routing of streams from multiple senders each to multiple recipients. This can be particularly onerous in terms of bandwidth required on the uplink and downlink, and in terms of the processing resources required to encode and decode the streams.

Therefore in one preferred embodiment of the present invention, a conference call may be hosted by a server of the VoIP provider 104 or a partner server 105, such that the client 222 on each user terminal 102 involved need only handle one uplink voice stream and once downlink voice stream (and one uplink video stream and one downlink video stream in the case of a video conference), with the mixing of the different users' streams and multicasting of the mixed streams to the users being performed by the server 104 or 105 (rather than each user terminal 102 having to multicasting to each other user for example). In this case at least one participating user of the conference call may be required to have a license to use the server 104 or 105, and hence an authorisation mechanism is desired to verify that at least one of the participants is indeed so authorised.

Alternatively or additionally, a particularly high performance codec may be provided for the voice and/or video conferencing (high perceptual quality for low bitrate cost), to be run by the clients 222 and/or host server 104 or 105. In this case at least one participating user of the conference call may be required to have a license to use the codec, and again an authorisation mechanism is desired to verify that at least one of the participants is so authorised.

To establish a conference call, an organizing or initiating user (the conference "leader") indicates the usernames of the desired participants to the VoIP server 104 via his or her client application 222 (being the usernames of existing contacts). In an embodiment where the partner server 105 is to host the conference (i.e. acts as the conference bridge), the VoIP server 104 may look up and forward the IP addresses of the participants to the partner server 105 to allow it to set up the necessary multicasting connections between the partner server 105 and user terminals 102 of the identified users over the internet 108. In an embodiment where the conference is hosted from the VoIP server 104 itself (i.e. the VoIP server 104 acts as the conference bridge), it may look up the necessary IP addresses and set up the multicasting connections from there. In an embodiment where the conference is to be hosted from one of the participating user terminals 102 (e.g. the user terminal of the user initiating the conference), the VoIP server 104 may look up and return the IP addresses to the relevant user terminal 102 which can then use them to establish connections directly between the participating user terminals 102. Alternatively the bridge or host 102, 104 or 105 could determine the IP addresses from a distributed peer-to-peer database. In embodiments the bridge or host 102, 104 or 105 may initiate the connection to the multiple other participants so that each participant other than the initiating participant receives an alert of an incoming call (via the server 104 or 105 and/or gateway 106 where appropriate). Alternatively each of the participants may individually call into the conference at a desired time by sending a call-set up request to the host or bridge 102, 204 or 105 (again via the server 104 or 105 and/or gateway 106 where appropriate).

Another possible embodiment would operate similarly to that described in the preceding paragraph, except that the "MCU server" 104 or 105 could be replaced by access to a distributed peer-to-peer network. I.e. As an alternative or in addition to a centralized server providing the fan-out to multiple receivers, and one of the end clients providing this fan-out, there is a third possibility, which is that a client giving a correct access code gives the client the authority to send his video to some dedicated or client-sided distributed infrastructure. (A reason a distributed infrastructure is useful particularly for video is that if the video MCU is hosted on some client, it might be that no client has enough upload bandwidth to send streams to each participant).

Referring to FIG. 3, the initiating participant (the "leader") may create a group for the conference from their contact list, e.g. by dragging and dropping contacts from the contact list panel 304 into one of the other panels 306 or 308. The group created by the conference leader determines who is allowed to be involved in the call from the perspective of the participants themselves (e.g. because the topic of the conference is confidential). However, as discussed above, it may also be desired from the perspective of the VoIP provider or partner that at least one of the participants is validly licensed to use the conferencing service, e.g. having a license to use hosting facilities and/or a special codec.

As a general rule, every customer of the audio conferencing service will preferably be a registered user of the VoIP system (i.e. the system implemented by means of the instances of the VoIP client 222 provided by a particular VoIP provider) and as such will have a username identifying them within the VoIP system. Furthermore, if they join the audio conference from a suitably enabled VoIP client 222 that has been integrated or otherwise associated with a license to access the conferencing service, they preferably should not have to enter any access codes or PINs or anything else to assert their identity or prove they have a license. In this case the VoIP client 222 and server 104 and/or 105 will be arranged to take care of authorizing the license automatically. For example the VoIP client 222 may be configured to automatically supply an indication of its integrated license (e.g. a license number or security certificate) to the VoIP server 104 or partner server 105 and in response the server 104 or 105 may be configured to automatically authorize (verify) whether the indication represents a valid license. Alternatively the client may submit its user's username to the VoIP server 104 or partner server 105, either of which may be configured to map usernames to a record of valid licenses and verify whether the user with the submitted username currently has a valid license.

However, there are situations which might well cause a licensed user to be unable to take advantage of any automatic integration of the license scheme with a VoIP client 222.

The integration of audio-conference licensing into the VoIP client 222 is something that will preferably done for all new instances of the VoIP client 222 that are distributed going forward. However, in the meantime, the entire current user base for the VoIP service will not necessarily have obtained the most up-to-date version of the client, and may instead therefore be accessing the service with an older version having no associated license. This may be termed herein a "legacy client". For any user using a legacy client with no special integration or other association with the software license required for the VoIP service, entering a PIN is a good substitute for that integration.

Secondly, audio conferencing is such a widespread and widely used service that it will be likely subscribers would wish to access the service from their car, or at the airport, or somewhere else with only a land-line or mobile phone available when it is time for the conference. In fact, although VoIP offers (in many cases) a service that compares favorably to a "dumb" POTS phone, it is quite possible that the conference service will be attractive even to people who just want audio conferencing and are not VoIP users at all. Such users will preferably be allocated a username for the VoIP system as a result of purchasing a subscription to the audio conferencing service, but there will undoubtedly be some people who are just late adopters and will use the subscription as a conference service from a phone connected to only a conventional fixed-line or mobile cellular telephone network (a "conventional" telephone). So these old-world users may be required to enter a PIN so the VoIP provider or partner can verify their software license to use the service.

In a preferred embodiment, the user of the conventional telephone 107 dials into the conference host or bridge 102, 104 or 105, e.g. using a special telephone number that has been set up for the purpose of the conferencing service or the particular conference itself. This may be achieved by dialing in via the gateway 106 which uses the dialed phone number to establish a route onwards for the call in IP format from the gateway 106 to the relevant host or bridge 102, 104 or 105. Alternatively in the case where the user of the conventional telephone dials in to the partner directly, the partner's equipment 105 could be provided with a separate connection to the circuit-switched telephone network 109. Similarly, the partner's web services load balancer might also have to be provided with a separate DNS name by the VoIP provider, so that the URLs that customer's see will be a URL of the VoIP provider rather than a partner URL.

The call set up request from the conventional telephone 107 and circuit-switched network 109 may be routed from the gateway 106 or partner server 105 to the VoIP server 104 and/or hosting end-user terminal 102 where it may be checked that the source (incoming) telephone number is an expected participant of the conference defined by the conference leader, e.g. based on a caller ID system (CLD). Alternatively the VoIP server 104 or client 222 on the user terminal 102 of the conference organizer may supply information on expected participants to the partner server 105 to be checked there. This ensures the conventional telephone user is invited to the conference from the perspective of the other participants (e.g. so a stranger doesn't listen in on a private conversation).

However, according to embodiments of the present invention, a separate PIN may be required to be entered by the user of the conventional telephone 107 to verify that he or she is an authorized licensee of the conferencing service. In embodiments this may only be required if none other of the participants accessing via their VoIP client 222 is a licensee (i.e. the requirement is that at least one participant of the conference is a licensee).

In an alternative embodiment the host or bridge 102, 104 or 105 could send a call-set-up request out to the telephone 110, e.g. via gateway 106 or possibly directly from the partner equipment 105, so that the telephone user receives a ring indicating an incoming call and thereby inviting the user of the telephone 110 to the conference. In this case no automated check of the invited user's identity may be required from the perspective of the participants, but an authorization process may still be required to check whether that user has a suitable license.

Either way, to achieve the required license authorization, the user of the conventional telephone 107 is prompted via their telephone 107 by the software on the host or bridge 102, 104 or 105 (whichever he or she dials into or is invited by) to enter his or her PIN number. The telephone user then dials in the PIN on the telephone keypad and from there the PIN is supplied via the telephone network 109 and gateway 106 to the host or bridge 102, 104 or 105 to be verified. For example the PIN may be transmitted across the circuit switched network 109 in the form of a DTMF (dual tone multi frequency) signal, and converted to IP format at the gateway 106. In one embodiment, the PIN is forwarded from the VoIP server 104 to the partner server 105, and the partner server infrastructure 105 will map the PINs to the identities of particular respective licensees. On condition that the partner server 105 has verified that the PIN does correctly map to a valid license, it returns a response to the VoIP server 104 and/or host 102 authorizing the conference call to proceed. Alternatively the mapping and authorization of PINs may be performed at the VoIP server 104. In the case where the conference is hosted from an end-user terminal 102, the client 222 on that terminal may be configured to consult the server 104 or 105 with the relevant PIN details in order to request the necessary authorization for the conference to go ahead.

Typically the VoIP server 104 will maintain a list of usernames for each user of the VoIP system, i.e. of the VoIP system associated with the particular VoIP provider in question. The username is typically not the user's actual name, but rather a unique identifier that uniquely identifies the user within the VoIP system in question. Hence the PIN number is an additional, second user identifier in addition to the username. Each of the PIN and username individually identifies the user uniquely within the VoIP system in question. Other embodiments are also possible, including some where the PIN offered is not strictly a user identifier at all. For example, the PIN could be just the index number of a string in a database. The string at that index may appear to be some random digits, but in fact would be or map to a license for the partner product, signed by the VoIP provider and any other appropriate parties.

In embodiments, for the purpose of verifying the license the partner server 105 or VoIP server may just verify that the PIN maps to a valid license and allow the conference on that basis. In other embodiments, one of the partner server 105 and/or the VoIP server 104 may be arranged to map the PIN (a second user identifier) to the user's username (a first user identifier), and either check that the PIN maps to a valid username and/or check that the username maps to a valid license. If the username is passed to the partner server 105 for use in such verification, the VoIP server 104 preferably does not share the username with the partner server in clear form, but instead sends an anonymized encrypted version of the username such as an hash of the username.

In one preferred embodiment, the partner is an OEM-supplier of a conference call service. In this case, this means that the VoIP provider pays the partner some fee per month for every user that the VoIP provider authorizes to use the partner conference service. The VoIP user, in turn, pays the VoIP provider some per-month fee to use this conference service. The end user need not know that the service is provided from the partner—everything from the VoicePrompts to the "telephone directory" name associated to the number that the user dials may appear to be associated with the VoIP provider from the perspective of the user. So one of the issues is that users pay and get authorization from the VoIP provider to use the service, but the service is actually provided via the partner's infrastructure. In fact, the partner may not even want to know the username of authorized users, because it may consider this personally identifiable information. On the other hand, the partner may have a rule that says not only must users be authorized users to request a dial-in number and access code, but in addition, there must always be at least one authorized user present in the actual conference call itself. This is because the partner may want to prevent a situation where an office manager or such like is the only person with an account, and the office manager just obtains conference dial-in numbers and access codes on behalf of everyone who needs to have a conference call. The partner may require only one user to have a license during the call (that person may be the "organizer" of the conference), but they would want to prevent the situation where nobody in the conference call actually ever got a license.

To address this, the arrangement between the VoIP provider and the partner may have the following elements.

Firstly, the partner server 105 will not see a list of VoIP usernames of authorized users, but instead will be provided with a list of hashed user names. When a user visits the VoIP provider's website to obtain a dial-in number and access code, the VoIP provider's server 104 will be able to keep a record which says user "JoeEveryman999" was given conference access code 1234567, but will inform the partner server 105 that user "AD123hiir2i342i0" was given conference access code 1234567". The VoIP provider server 104 will also inform the partner server 105 that user "AD123hiir2i34i0" was given PIN number 9876543. The partner server 105 will be configured to then run fraud detection software to try to catch users who appear to be in two conferences at once, etc. but preferably they'll never see the actual VoIP usernames of users.

Secondly, even though only an authorized user can obtain an access code from the system, it may be that the authorized user gives out the conference access code to a group of people. However, none of those people might be authorized to get their own access codes. So typing in the access code when you join the conference call may not be sufficient to help the partner know if any of the people on the call is actually an organizer with a license. Hence the PIN idea—the partner wants to know that someone on the call actually has a PIN on the system—only authorized users ever get PINs, while anyone who might dial in to the call gets the access code. The partner won't know anything personal about the user who dials in the PIN, but since they do have a list of valid PINs, the partner will be able to tell that there is someone on the call who has a license, so the conference call can proceed. (It might be that someone else other than the organizer learns the PIN, but that may be acceptable. For example suppose a user sets up a conference call for next Monday, and then gets ill and can't make the call. It may be allowed for the user to ask a substitute to lead the call in his or her place—in embodiments the partner may just want ensure that someone with a license is on the conference call, and that that person cannot be on two conference calls at once.

The partner server 105 may be configured to use the hashed or otherwise encrypted VoIP username for fraud detection and/or for gathering statistics. In the case of fraud detection, the partner server 105 may be arranged to check based on the hashed username that the same PIN is not being used for two different users at once, or that the same user does not appear to be participating in two different conferences at once. In the case of gathering statistics, the partner server 105 may collect information such as "30% of the authorized users got a license but never set up a conference call even once" or "10% of the authorized users asked the system for 5 or more conference access codes." etc.

In further embodiments, the username information may also be passed to the client 222 of each participant and reflected in various parts of the GUI. For example, the VoIP server 104 may map the PIN to the actual username used within the VoIP system of the particular VoIP provider in question, and this will enable the name of the speaker to "light up" or be otherwise highlighted in each participant's GUI; or users may be allowed to record their respective names once each in some back-end infrastructure (for voicemail), and then the list of names of conference participants can be generated for roll call, etc.

It will be appreciated that the above embodiments have been described only by way of example.

In an alternative application of the present invention, rather than a conventional telephone of a circuit-switched network, a participant may attempt to access a conference via a legacy client application that is not integrated with an intrinsic license, or not integrated with the licensing scheme in that it is not recorded by the partner server 105 or VoIP server 104 as being associated with a license. In this case the user in question is prompted to enter a PIN or some other secondary user identifier via their legacy client, which then returns the PIN to the host or bridge, 102, 104 or 105 for authorization. The authorization can then proceed in a similar manner as described above.

Another example would be access to the conference via a "dumb IP phone", i.e. a dedicated phone that makes calls using IP via Internet 108. This could be a SIP phone that plugs in via an Ethernet but really only dials phone number; or perhaps an adaptor which connects between a hone phone and an Ethernet connection, to configure the phone (usually it has a built in web server for configuration) to point to an outgoing SIP proxy, and it can call phone numbers and/or receive calls via the VoIP service even.

The invention may extend to any system that enables a user to use a telephone or legacy client to "activate" any software licence, in real-time, and potentially with some extra parameter information—in the above example the licence is activated for the duration of the phone call, but an alternative would be for the caller to be provided with an "options" menu which would let him or her activate the licence during some future hour, or even enter a key that would retroactively authorize some previous conference call. E.g. the customer might have a subscription to a conferencing service, and if no one activates this license for a particular call there is a 24-hour period during which a provisioned user can activate his licence retroactively; but after this period some generic per-minute charge will be accrued to one or more of the participants (e.g. the conference organiser).

In the particular embodiments discussed above, the user pressed some keys on the dial-pad, which caused particular DTMF signals to be received by the other side, resulting in the software license for audio-conferencing to be activated for the duration of the call. However, one other alternative would be for voice recognition to be used instead of DTMF tones, or the system might allow a subscriber to register his or her caller ID (CLI) of the phone into the system beforehand. This would not necessarily involve any DMTF tones or any special phone-side message passing at all, for example, the user might log in to his account via HTTP, and after requesting this registration service, be told to call a certain phone number from the telephone whose CLI (calling line identification, "caller ID") matches the one the user wishes to register. If the system has a small block of telephone numbers it can rotate for this service, it would be possible to hand each user a different telephone number useable for a following predetermined time period, e.g. the next ten minutes. In this way, the user would only have to dial the number in question, and nothing else. The answering system would recognize the caller's caller ID and immediately reply to the caller with a message like: "this telephone number has now been registered with the system; from now on, when you call into audio conferences from this phone, you will not be prompted for a PIN. thank you very much."Further, while the above talked specifically of a PIN (a personal identification number), and this may be preferred in embodiments, the licenses are personal and each one is associated to a particular human user (and therefore the authentication of a particular user call is enough to identify a particular license) so the methods disclosed here are applicable in other systems where it some other particular authorization information which will have to be entered. An example might be that before the audio conference, the user would have to log in to his web account and request a one-time authorization number for that particular audio conference. In that system, at least one user would have to enter that authorization number into the conference call in order to activate the conference (e.g. this may be an appropriate user interface for those user who didn't want to reveal any personal information such as a PIN over the phone).

Further, in systems where a telephone terminal or legacy client has the ability to enter for example alphanumeric data, the idea of a PIN may be extended to any alphanumeric identifier that suitably identifies the user in question as being licensed to use the service.

Further the present invention is not limited to the case of a conventional phone and circuit-switched network, but could be applied to any situation in which at least one participant in a communication session does not have the necessary front-end interface technology to be authorised in the same manner as the other participants. One example given above is that of a legacy VoIP client not having an integrated license. A different example might be an instant messaging (IM) recordal or archiving service. E.g. in an e-commerce or customer care application, certain parts of certain IM streams need to be recorded. In this case the specialized customer care application might be provided with a simple button to click in order to start recording/archiving of the stream; and in order to enable customer care to take place even if the agent only has access to a generic IM system, IM-based commands may be provided to start, stop or manage the IM recording and archiving, and these would automatically activate the appropriate software licenses in the background.

The PIN or other secondary identifier need not necessarily be indicative of the user's personal identity. Instead it may comprise some indicator that can be associated unambiguously via a defined method or algorithm with a first indicator. Preferably, as a result of the second indicator being indicated, the system acts as if the first indicator (to which the said second indicator is associated) was in fact itself indicated.

Other variants may become apparent to a person skilled in the art given the disclosure herein. The present invention is not limited by the example embodiments but only by the appendant claims.

The invention claimed is:

1. A method comprising:
   from each of one or more first user terminals of a respective one or more users, receiving a respective first indication via a first communication network via a first interface between each respective first user terminal and a communication service;
   conditionally verifying each of said users of the first user terminals as being authorized to participate in a conference associated with the communication service based on the first indication received via the first interface;

from one or more second user terminals of a respective one or more users, receiving a respective second indication via a second, alternative interface over a second communication network between each respective second user terminal and the communication service, wherein the second interface is not operable to provide the first indication;

verifying whether a same Personal Identification Numbers (PIN) has been received from at least two separate users;

responsive to verifying the same PIN has been received from the at least two separate users, removing the at least two separate users from the conference associated with the communication service;

conditionally verifying each of said users of the second user terminals as being authorized to participate in the conference associated with the communication service based on a second indication received via the second interface; and verifying at least one of said users of the first user terminals or at least one of said users of the second user terminals has a license associated with using the communication service to multicast participant audio to all users authorized to participate in the conference over at least the first and second communication networks, the verifying the at least one of said users of the second terminals comprising mapping the second identifier received over the second communications network to a first identifier associated with the at least one of said users of the second user terminals, wherein responsive to determining that at least one second indication comprises a second user identifier associated with the respective user of the second user terminal, the method further comprises:

enabling storing a first user identifier for each of the users of the first and second user terminals, wherein the second user identifier associated with the respective user of the second user terminal is an identifier other than the first user identifier associated with said respective user of the second terminal; and enabling an additional check of each respective user of the second user terminals associated with each respective second user identifier based, at least in part, on a respective mapping between the second user identifier and respective first user identifier.

2. The method of claim 1, further comprising verifying at least one of the users of said first user terminals or at least one of the users of said second user terminals is licensed to utilize a codec associated with the communication service.

3. The of claim 1, further comprising receiving an indication of a valid license contained within at least one of said first indications or at least one of said second indications.

4. The method of claim 1, further comprising mapping a first user identifier and an associated second user identifier to a valid license associated with the communication service.

5. The method of claim 1, wherein at least some of the PINs comprise PSTN phone numbers.

6. The method of claim 1 further comprising prompting removed users to re-enter their PINs.

7. A computing device comprising:
one or more processors;
one or more computer-readable storage memories having stored thereon computer-readable instructions which, when executed by the one or more processors, perform operations comprising:
from each of one or more first user terminals of a respective one or more users, receiving a respective first indication via a first communication network via a first interface between each respective first user terminal and a communication service;

conditionally verifying each of said users of the first user terminals as being authorized to participate in a conference associated with the communication service based on the first indication received via the first interface;

from one or more second user terminals of a respective one or more users, receiving a respective second indication via a second, alternative interface over a second communication network between each respective second user terminal and the communication service, wherein the second interface is not operable to provide the first indication;

verifying whether a same Personal Identification Numbers (PIN) has been received from at least two separate users;

responsive to verifying the same PIN has been received from the at least two separate users, removing the at least two separate users from the conference associated with the communication service;

conditionally verifying each of said users of the second user terminals as being authorized to participate in the conference associated with the communication service based on a second indication received via the second interface; and verifying at least one of said users of the first user terminals or at least one of said users of the second user terminals has a license associated with using the communication service to multicast participant audio to all users authorized to participate in the conference over at least the first and second communication networks, the verifying the at least one of said users of the second terminals comprising mapping the second identifier received over the second communications network to a first identifier associated with the at least one of said users of the second user terminals, wherein responsive to determining that at least one second indication comprises a second user identifier associated with the respective user of the second user terminal, the method further comprises:

enabling storing a first user identifier for each of the users of the first and second user terminals, wherein the second user identifier associated with the respective user of the second user terminal is an identifier other than the first user identifier associated with said respective user of the second terminal; and enabling an additional check of each respective user of the second user terminals associated with each respective second user identifier based, at least in part, on a respective mapping between the second user identifier and respective first user identifier.

8. The computing device of claim 7, wherein the operations further comprise verifying at least one of the users of said first user terminals or at least one of the users of said second user terminals is licensed to utilize a codec associated with the communication service.

9. The computing device of claim 7, wherein the operations further comprise receiving an indication of a valid license contained within at least one of said first indications or at least one of said second indications.

10. The computing device of claim 7, wherein the operations further comprise mapping a first user identifier and an associated second user identifier to a valid license associated with the communication service.

11. The computing device of claim 7, wherein at least some of the PINs comprise PSTN phone numbers.

12. The computing device of claim 7, wherein the operations further comprise prompting removed users to re-enter their PINs.

13. The computing device of claim 7, embodied as a server.

14. One or more computer-readable storage memories having stored thereon computer-readable instructions which, when executed by the one or more processors, perform operations comprising:

from each of one or more first user terminals of a respective one or more users, receiving a respective first indication via a first communication network via a first interface between each respective first user terminal and a communication service;

conditionally verifying each of said users of the first user terminals as being authorized to participate in a conference associated with the communication service based on the first indication received via the first interface;

from one or more second user terminals of a respective one or more users, receiving a respective second indication via a second, alternative interface over a second communication network between each respective second user terminal and the communication service, wherein the second interface is not operable to provide the first indication;

verifying whether a same Personal Identification Numbers (PIN) has been received from at least two separate users;

responsive to verifying the same PIN has been received from the at least two separate users, removing the at least two separate users from the conference associated with the communication service;

conditionally verifying each of said users of the second user terminals as being authorized to participate in the conference associated with the communication service based on a second indication received via the second interface; and verifying at least one of said users of the first user terminals or at least one of said users of the second user terminals has a license associated with using the communication service to multicast participant audio to all users authorized to participate in the conference over at least the first and second communication networks, the verifying the at least one of said users of the second terminals comprising mapping the second identifier received over the second communications network to a first identifier associated with the at least one of said users of the second user terminals, wherein responsive to determining that at least one second indication comprises a second user identifier associated with the respective user of the second user terminal, the method further comprises:

enabling storing a first user identifier for each of the users of the first and second user terminals, wherein the second user identifier associated with the respective user of the second user terminal is an identifier other than the first user identifier associated with said respective user of the second terminal; and enabling an additional check of each respective user of the second user terminals associated with each respective second user identifier based, at least in part, on a respective mapping between the second user identifier and respective first user identifier.

15. The one or more computer-readable storage memories of claim 14, wherein the operations further comprise verifying at least one of the users of said first user terminals or at least one of the users of said second user terminals is licensed to utilize a codec associated with the communication service.

16. The one or more computer-readable storage memories of claim 14, wherein the operations further comprise receiving an indication of a valid license contained within at least one of said first indications or at least one of said second indications.

17. The one or more computer-readable storage memories of claim 14, wherein the operations further comprise mapping a first user identifier and an associated second user identifier to a valid license associated with the communication service.

18. The one or more computer-readable storage memories of claim 14, wherein at least some of the PINs comprise PSTN phone numbers.

19. The one or more computer-readable storage memories of claim 14, wherein the operations further comprise prompting removed users to re-enter their PINs.

* * * * *